Fig_1

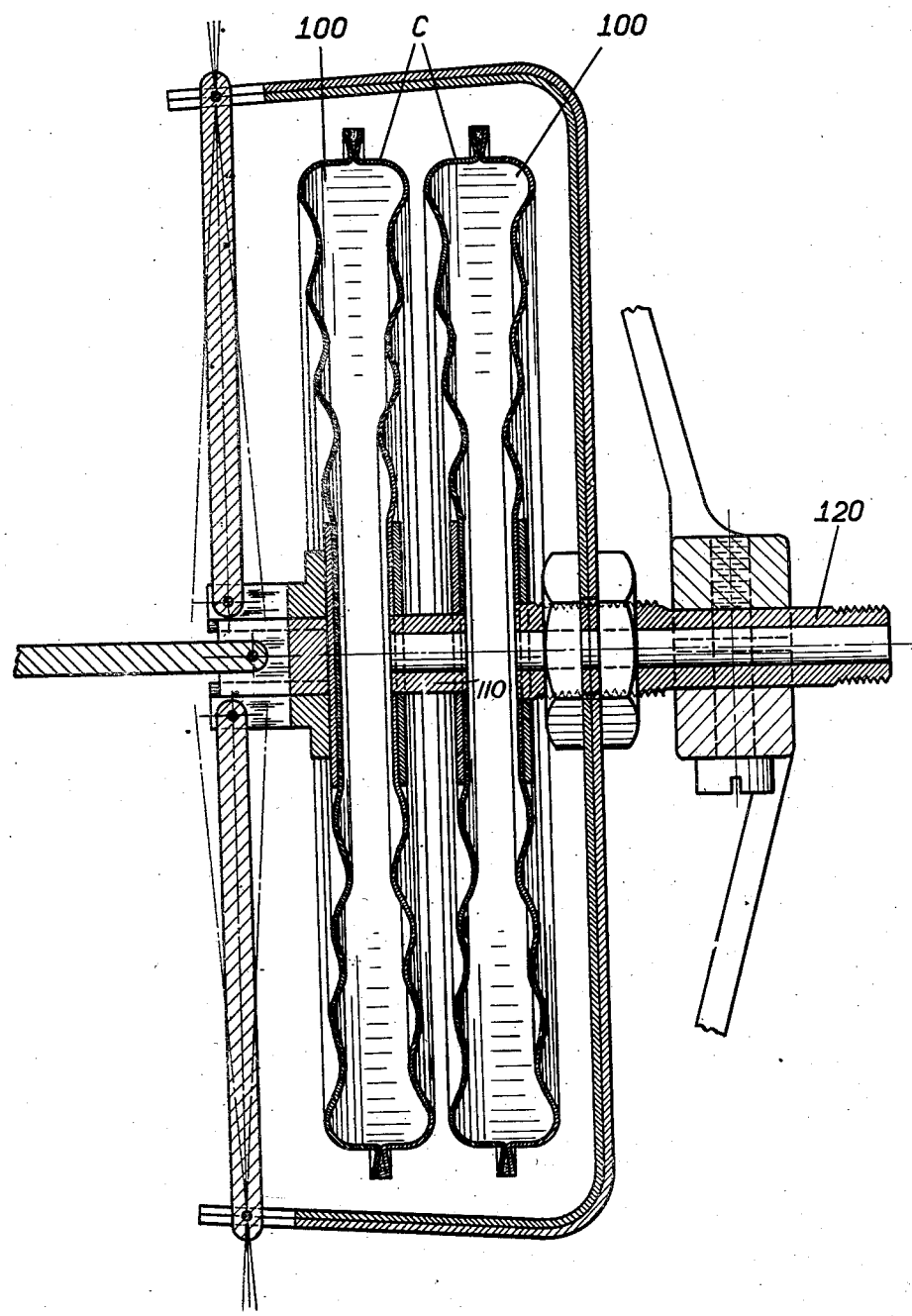
Fig_3

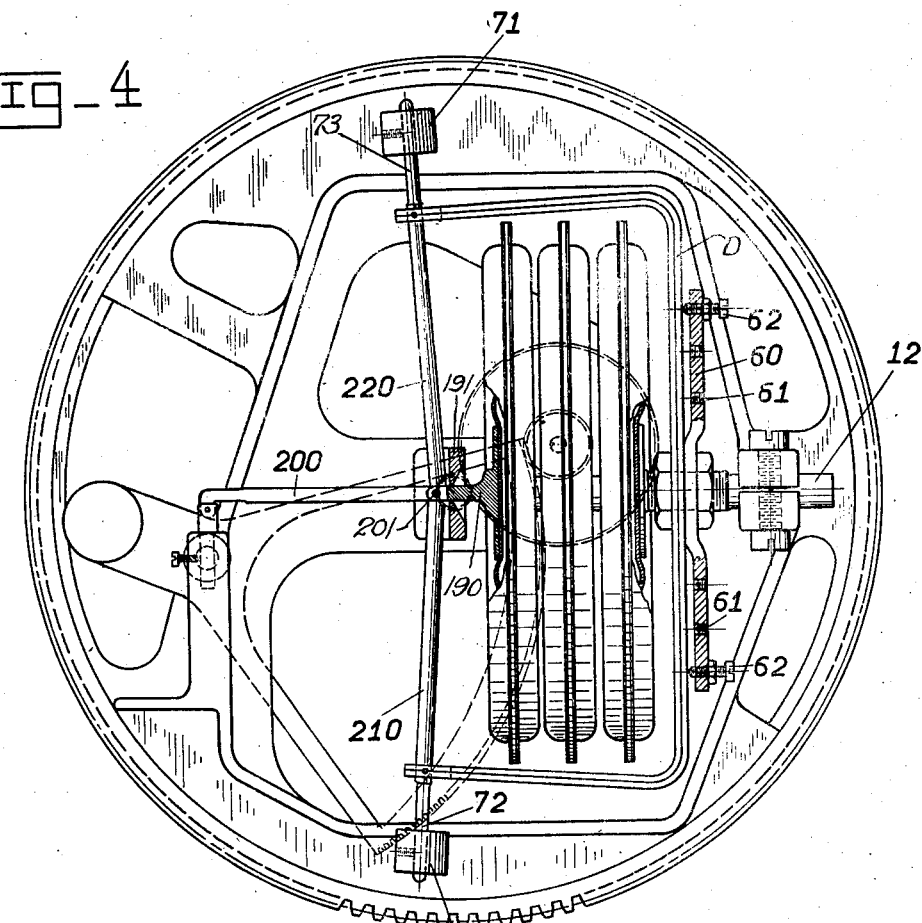
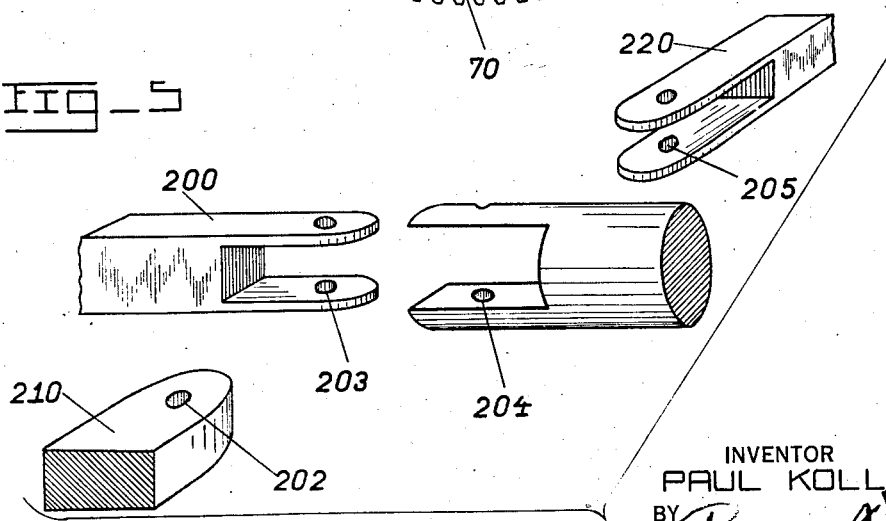

Patented Dec. 20, 1938

2,140,704

UNITED STATES PATENT OFFICE 2,140,704

TEMPERATURE COMPENSATOR FOR
PRESSURE RESPONSIVE DEVICES

Paul Kollsman, Greenwich, Conn.

Application September 30, 1935, Serial No. 42,827

24 Claims. (Cl. 73—110)

This invention relates to instruments responsive to variations in pressure—including both those responsive to varying atmospheric pressure and those responsive to varying pressure greater than atmospheric pressure including altimeters, barometers and pressure indicators both static and dynamic. An object of the invention is to apply a compensating force, varying in amount in accordance with the needs for compensation, to the principal operating unit which unit functions in response to variations in pressure. A further object of the invention is to improve the method and means for applying a varying temperature compensating force to the operator in such a sensitive pressure indicator.

Further objects are to improve in general the dependability, simplicity and sensitiveness of a sensitive pressure indicator particularly an altimeter. Included in the objectives of the invention is the balancing out substantially all disturbances and error arising from the action of vibration of a carrier (airplane) upon mass possessing parts of the instrument. In obtaining this objective substantially perfect balancing out of all inertia forces is an objective in an instrument utilizing a simple link lever and gear train and multiplying the small movement of an operator in its application to the movable indicator and eleminating all necessity for a resort to flexible connections such as cords and chains.

Generally, it is an objective to improve the construction and sensitiveness of a sensitive pressure responsive indicating device.

Figure 1:
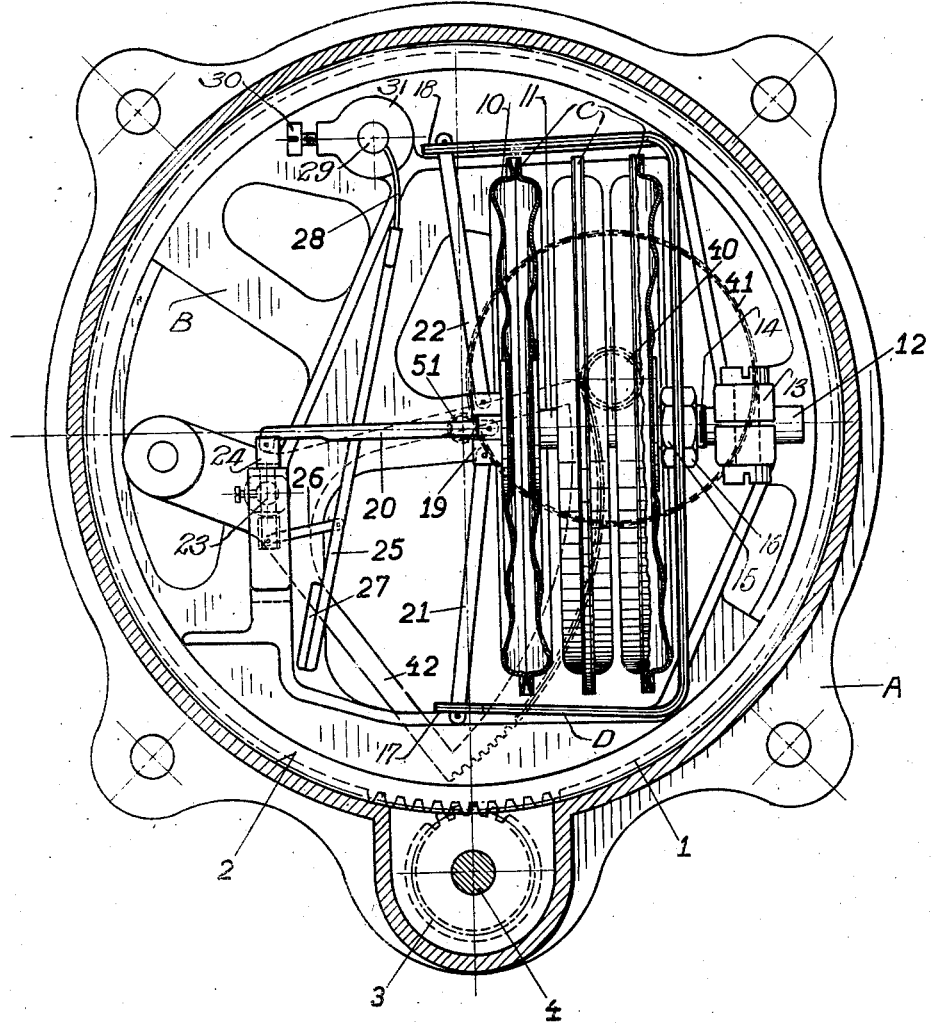
Figure 2:
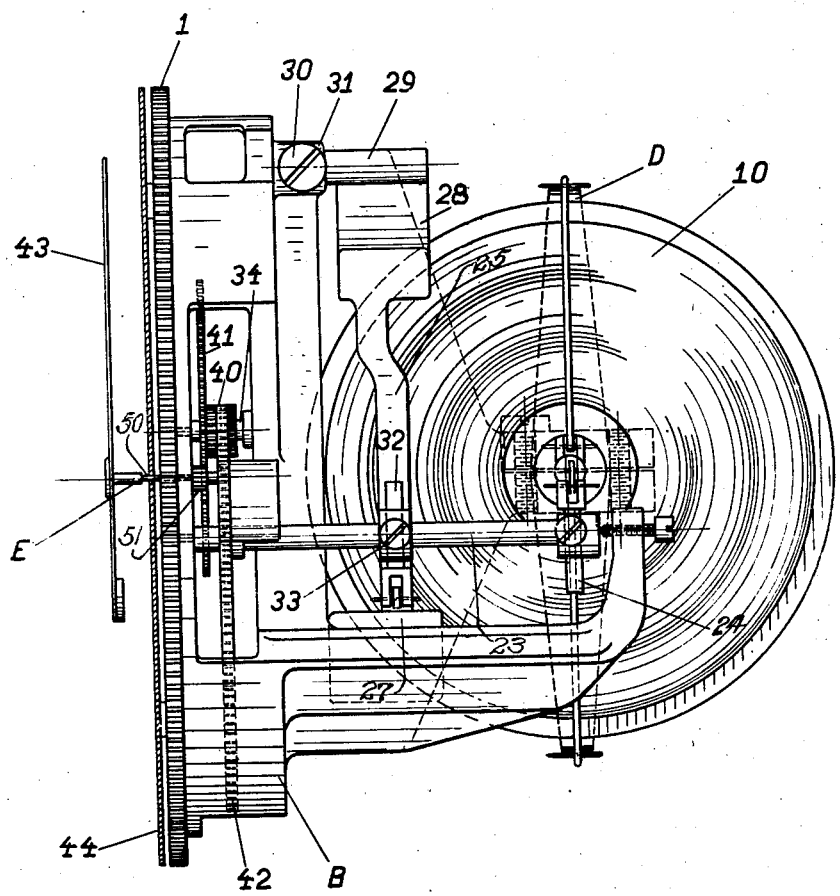

The claims are directed to illustrative embodiments of the invention described in the following specification in conjunction with the accompanying drawings which form a part thereof. In the drawings Fig. 1 is partly a front elevation and partly a vertical cross-section with parts shown in dotted lines; Fig. 2 is a side elevation of the mechanism with the casing removed. Fig. 3 is an enlarged view in vertical cross section of a modification principally of the aneroid gang; Fig. 4 is a view corresponding to Fig. 1 with the casing removed showing a modification; and Fig. 5 is a scattered assembly view of the operator and compensator connections.

Any usual casing A is provided preferably of a type suitable for mounting in the position shown in Fig. 1 on an instrument panel. B is a frame fixed to the peripherally toothed ring I mounted to rotate in the channel 2 of casing A by means of a gear 3 suitably manually operated from shaft 4, as by a knob not shown. The frame B provides suitable extensions, brackets and lugs for mounting the various parts and providing the necessary bearings. In Figs. 1 and 2 the altimeter type of sensitive pressure responsive indicating device is shown. In this embodiment a gang C of 3 aligned aneroid type disc capsules 10 are suitably secured axially one to the other as by studs 11 with an axially positioned mounting stud 12 extending out from the fixed face of the gang. This stud 12 may be clamped adjustably in the clamp 13 of frame B so as to permit both axial and rotary adjustment. Independently of this adjustment an adjustment for the compensator D is provided by means of the threaded portion 14 of stud 12 and carrying the adjustable clamp nuts 15 and 16. The U-shaped bimetallic compensator spring D is fixed at its midportion to the frame B with its free ends 17 and 18 free to function and terminating the arms of this compensator, which arms embrace the gang of aneroid capsules. It has been found that this temperature compensating spring may be made preferably of brass and Invar steel.

Opposite to the fixed mounting 12 of the aneroid gang an operator 19 is secured. Toggle links 21 and 22 pivotally connect the ends 17 and 18 respectively of the compensator D with the operator 19, while a link 20 connects the operator 19 with the rock-shaft 23 through adjustable lever 24. Compensator arm 25 is fitted at its free end with a pivoted link 26 and a mass compensator 27 and is normally slightly spring urged for motion counterclockwise, as seen in Fig. 1, by spring 28 fixed to stud 29. It is adjustable by set screw 30 in its position in bracket 31. This compensator lever 25 is linked to the rock shaft 23 at the lower end of adjustable lever 32 by link 26. Screw 33 fixes and adjusts lever 32. The levers 24 and 32 fixed to and extending in opposite directions from rock shaft 23 cause the inertia effect of mass 27 to tend to compensate the inertia effect of the movable mass between the frame and operator 19. The pin and gear 40 and 41 are fast to the same shaft 34 suitably journalled in frame B, with pinion 40 in mesh with and operated by toothed sector 42. The indicator E shown in the form of a rotary pointer 43 is adapted to cooperate with a suitable scale 44 which may be formed on the toothed ring I or on a dial attached thereto. This pointer is, as shown, suitably counter-balanced and mounted on shaft 50 upon which is fixed gear 51 driven by gear 41.

In this embodiment it is usual for the aneroid capsules to be as nearly completely evacuated as possible so that when atmospheric pressure diminishes on the increase in altitude of an airplane, the resiliency of the walls of the capsules tends to move the operator 19 to the left as viewed in Fig. 1. This metallic resilient tendency to move the operator 19 to the left as viewed in Fig. 1 is positively supplemented by spring D operating in a varying degree through toggle links 21 and 22. As the compensator spring D is preferably a bi-metallic spring its supplemental effect upon operator 19 is of a temperature compensating nature. However, the stiffness of the metal wall structure of the capsules increases with cold, that is, increases with a lowering of the temperature. But when the capsules expand upon a reduction of the load, that is, upon the reduction of atmospheric pressure, the amount of compensation for change in temperature should be less than otherwise for a higher pressure. This desired variation is accomplished by the straightening out of the toggle arms 21 and 22 so that the compensating component of force in the operative movement direction of operator 19 is less. Objectively, in the construction shown in Figs. 1 and 2 the toggle arms 21 and 22 approach dead center as the capsules expand and as the operator 19 moves to the left. A component of compensating force applied by the compensator spring D to the operator is therefore less and is variably less as this position and condition is approached. I have found that the mechanism of the illustrated embodiment will provide an almost perfect compensation for changes in temperature.

The angle formed by the toggle arms 21 and 22 may be varied by adjusting the screw nuts 15 and 16. In fact all of the adjustments may be effected together with calibration at the factory and before assembling with the casing A.

In Fig. 3 the construction is modified merely in that the gang of aneroids C comprises only 2 aneroid capsules 100 with interiors in fluid connection through perforated stud 110. The mounting 120 is tubular to permit connection with a suitable fluid pressure system the pressure of which is to be measured. The dot and dash lines show the adaptability of the toggle arms for both expanded and contracted condition of the gang of aneroids. If the capsules C are operating on suction pressure the operation of compensator D is the same as described for Figs. 1 and 2. If, however, they are to function from above atmospheric pressure within their cavities down towards lower pressure, that is from an expansion towards collapse, the toggle arms 21 and 22 work in supplement to the resilience of the capsules from left to right for the movement of operator 19 and compensate varyingly just as is required during this movement.

In Fig. 4 the construction of the aneroid gang may be either that shown in Figs. 1 and 2 or that shown in Fig. 3 but there is fixedly mounted on the support 12 a twin bracket adjuster 60, in each of the two arms of which are a plurality of tapped perforations 61 for mounting set screws 62, which may be screwed into contact with the arms of the compensator spring D to assist in adjusting and calibrating. The operator 190 may have a cylindrical stem passing through a slip bearing 191 which takes care of any tendency for movement out of the axis of the aneroids of this operator 190 due to vibration or shocks. It is, of course, to be understood that a pair of long radius pivoted stay arms might be substituted for the slip bearing 191. In this construction adjustable mass compensators 70 and 71 are shown adjustably secured to extensions 72 and 73 of the toggle arms 210 and 220 which arms together with the link 200 are all pivoted at the same pivot pin 201 passing through the perforations 202, 203, 204 and 205. All of these parts which functionally unite at this single pivot pin are shown just before assemblage in Fig. 5. By this arrangement all inertia influences are eliminated at the operator 190, which will transmit an indicating movement alone. The simple construction shown in Figs. 4 and 5 obviates the necessity of providing complicated compensators for inertia effects of movable members between the frame and the operator 190 including that of operator 190 itself.

In the claims, the term "impulse" is used in a broad sense to define the result of an actuation of a member which may appear as a force as well as a movement. If a member is actuated and permitted to move freely, the form of impulse will appear as a movement. If, on the other hand, the movement of an actuated member is restricted, the result will be an impulse in the form of a force. The term "impulse" is, therefore, intended to cover movements as well as forces and is so used in the claims.

What is claimed and desired to be secured by United States Letters Patent is:—

1. A temperature compensating pressure indicating device comprising a frame; a gang of one or more aneroid capsules having a centrally positioned mounting part extending out from one face and adapted to be mounted on said frame; an operator secured to the opposite face of said gang; an indicator; a motion multiplying link and lever train connecting said operator with said indicator; a temperature responsive spring compensator fixed at one end to said frame with its free end tending to move transversely to the axis of said gang of aneroids; and a link connecting said operator with the free end of said compensator and forming an angle other than a right angle with the axis of said gang whereby a varying compensating force component is applicable to said operator in the direction of its functioning movement.

2. A pressure responsive instrument providing a varying temperature compensation comprising a frame; a gang of one or more expansible and collapsible diaphragm capsules having a mounting on one side adapted to be secured to said frame; a temperature responsive U-shaped spring fixed at its mid-portion to said frame with its legs embracing said gang of capsules; an operator fixed to the outer face of said gang of capsules; and toggle arms extending from said operator to the free ends of said U-shaped spring whereby a varying component of force from said spring is applicable to said operator in the direction of its operating movement for compensating purposes.

3. The combination mechanism described in claim 1 and further characterized by the fact that said spring compensator is bi-metallic and is temperature varied in its force application to said operator.

4. The combination mechanism described in claim 2 and further characterized by the fact that said U-shaped spring is bi-metallic and is temperature varied in its compensating force application to said operator.

5. The combination mechanism described in claim 2 and further characterized by the fact that outward extensions are provided on said toggle arms and have mass weights to annul at said operator any disturbing effect from the mass of other parts.

6. The combination mechanism of claim 1 having provisions for adjusting said compensator.

7. The combination mechanism of claim 2 having provisions for adjusting said U-shaped spring.

8. The combination mechanism of claim 2 having provisions for adjusting said U-shaped spring bodily relatively to said frame and means for adjusting its effective functioning length.

9. A pressure responsive instrument providing varying compensation comprising, a frame; a gang of one or more expansible and collapsible diaphragm capsules having a mounting on one side adapted to be secured to said frame; a U-shaped spring fixed at its mid-portion to said frame with its legs embracing said gang of capsules; an operator fixed to the outer face of said gang of capsules; and toggle arms extending from said operator to the free ends of said U-shaped spring whereby a variating component of force from said spring for compensating purposes is applicable to said operator in the direction of its operating movement and whereby force components transverse to the direction of its operating movement are balanced.

10. A pressure responsive instrument comprising, a frame; an expansible and contractable pressure responsive member mounted on one face to said frame and extending outwardly from said locality of mounting; an operator part fixed to the outer face of said member; compensating arms fixed to said frame and embracing said member; a link for linking said operator to a part to be operated; toggle arms for connecting said compensating arms to said operator; provisions including a single pivot pin for completing the connecting with said operator of said toggle arms and said link; and guiding means permitting the movement of said operator back and forth in an operating direction while positively arresting movement transversely to said operating direction.

11. A sensitive pressure-responsive device comprising, in combination, a pressure sensitive member, mechanism operated by pressure-change responses thereof, a temperature sensitive member associated with said pressure sensitive member, adapted to develop pressures varying in magnitude and direction according to the temperature of said pressure sensitive member, mechanism for applying said pressures to said pressure sensitive member in varying amount and direction according to the amount of response by said pressure sensitive member, and counter-balancing mechanism cooperating with said mechanism functioning between said temperature responsive member and said pressure responsive members for neutralizing false pressures generated by accelerative movements applied to said instruments.

12. In a pressure responsive instrument the combination with a resilient diaphragm member adapted to create a primary impulse in response to a pressure acting thereon; of temperature responsive means for creating a secondary impulse in response to changes in temperature affecting said diaphragm; impulse combining means controlled by said member and connected to combine with said primary impulse a varying portion of the secondary impulse, depending upon the magnitude of the primary impulse, the portion decreasing towards zero upon a decrease towards zero of the magnitude of the primary impulse; and a movable actuated member connected to be actuated in response to the combined first plus the portion of the secondary impulse, whereby changes in resiliency of the diaphragm member caused by changes in temperature will be compensated, and the movement of the actuated member will become a true measure of the pressure acting on the diaphragm member.

13. In a pressure responsive instrument the combination with a resilient diaphragm member adapted to create a primary impulse in response to a pressure acting thereon; of temperature responsive means for creating a secondary impulse in response to changes in temperature affecting said diaphragm; impulse combining means controlled by movements of said member and connected to combine with said primary impulse a varying portion of said secondary impulse, the portion decreasing towards zero upon a decrease towards zero of the magnitude of the primary impulse; and indicating means connected to be actuated in response to the combined primary and the portion of the secondary impulse, whereby changes in resiliency of said member caused by changes in temperature will be compensated and the indicating means will be actuated in true response to changes in pressure acting on said diaphragm member.

14. In a pressure responsive instrument the combination with a resilient diaphragm member adapted to be moved in response to a pressure applied thereto; of temperature responsive means for creating varying forces in response to changes in temperature affecting said diaphragm member; and a variable force transmitting mechanism adjusted by movements of said member and connected to apply to said member increasing portions of the force exerted by said temperature responsive means upon increasing movements of the diaphragm member from its zero position in which no pressure acts on the same, whereby changes in resiliency of the diaphragm member caused by changes in temperature will be compensated and the movements of the diaphragm become a true measure of the pressure acting on said member.

15. In a pressure responsive instrument the combination with a resilient diaphragm member adapted to be moved in response to a pressure applied thereto; of temperature responsive means for creating varying forces in response to changes in temperature affecting said diaphragm member; a variable force transmitting mechanism adjusted by movements of said member and connected to apply to said member a varying portion of the force exerted by said temperature responsive means, the portion decreasing towards zero upon a decrease towards zero of the pressure acting on said member; and indicating means connected to be actuated in response to movements of said mechanism, whereby changes in resiliency of said member due to changes in temperature will be compensated and the indicating means be actuated in true response to changes in pressure acting on said member without a change of calibration of the instrument, the ratio of transmission between said member and indicating means remaining constant under all conditions.

16. In a pressure responsive instrument the combination with a resilient diaphragm adapted to be moved in response to a pressure applied thereto; of a bimetallic spring for exerting varying forces in response to changes in temperature affecting said diaphragm; and a variable force transmitting mechanism controlled by movements of said diaphragm and connected to apply to said diaphragm increasing and decreasing portions of the spring force upon increasing and decreasing movements of said diaphragm, respectively, whereby the movements of the diaphragm will become a true measure of the pressure acting on the same irrespective of changes in temperature affecting the resiliency of the diaphragm.

17. In a pressure responsive instrument the combination with a resilient diaphragm adapted to be moved in response to pressure acting thereon; of a spring force exerting member mounted for movement in a direction different from the direction of movement of the diaphragm; and a force transmitting link pivotally connected to said diaphragm and said member, respectively, whereby different portions of the spring force will be caused to act on the diaphragm, depending upon the movements of the diaphragm.

18. In a pressure responsive instrument the combination with a resilient diaphragm adapted to be moved in response to pressure acting thereon; of a spring force exerting member mounted for movement in a direction substantially at right angles to the direction of movement of said diaphragm; and a force transmitting link pivotally connected to said diaphragm and said spring member, respectively, whereby different portions of the spring force will be caused to act on the diaphragm, depending upon the movements of the diaphragm.

19. In a pressure responsive instrument the combination with a resilient diaphragm adapted to be moved in response to pressure acting thereon; of a bimetallic spring mounted for movement with its free end substantially at right angles to the direction of movement of said diaphragm; and a force transmitting link pivotally connected to the free end of said spring and to said diaphragm, respectively, whereby different portions of the spring force will be caused to act on the diaphragm, depending upon the movements of the diaphragm.

20. In a pressure responsive instrument the combination with a resilient diaphragm having a central stud; of a U-shaped bimetallic spring mounted approximately at its center for movement of its free ends substantially at right angles to the direction of movement of said stud; and a pair of force transmitting levers pivotally connected to the free ends of the spring and the stud, respectively, causing the spring to act on the diaphragm in a varying degree, depending upon the movements of the diaphragm.

21. In a pressure responsive instrument the combination with a resilient diaphragm having a central stud; of a U-shaped spring mounted approximately at its center for movement of its free ends substantially at right angles to the direction of movement of said stud; and a pair of force transmitting levers pivotally connected to the free ends of the spring and the stud, respectively, causing the spring to act on the diaphragm in a varying degree, depending upon the movement of the diaphragm.

22. In a pressure responsive instrument the combination with a resilient diaphragm having a central stud; of a U-shaped bimetallic spring mounted approximately at its center for movement of its free ends substantially at right angles to the direction of movement of said stud; a pair of force transmitting levers pivotally connected to the free ends of the spring and the stud respectively; and stop means adjacent to at least part of the spring.

23. In a pressure responsive instrument the combination with a diaphragm having a central stud; of a U-shaped bimetallic spring mounted approximately at its center for movement of its free ends substantially at right angles to the direction of movement of said stud; a pair of double armed levers pivotally connected intermediate their ends to the free ends of the spring and with one arm to said stud; and a counter-balancing weight on the free arm of each one of said levers.

24. In a pressure responsive instrument the combination with a diaphragm member having a central stud; of a U-shaped spring mounted approximately at its center for movement of its free ends substantially at right angles to the direction of movement of said stud; a pair of levers pivotally connected to the free ends of the spring and the stud, respectively, and indicating means connected to be actuated by the movements of said stud.

PAUL KOLLSMAN.